United States Patent Office 2,848,350
Patented Aug. 19, 1958

2,848,350
COATING FOR CURED POLYESTER SURFACES

Luther L. Yaeger, Madison, Wis., assignor, by mesne assignments, to Tru-Scale, Inc.

No Drawing. Application March 7, 1955
Serial No. 492,729

1 Claim. (Cl. 117—47)

This invention relates to a method and composition which provides an adherent coating for surfaces of cured polyester sheets.

It is desirable to provide a coating which may serve as a lacquer or a paint vehicle on the surface of cured polyester parts or sheets. For example, typical polyesters are obtained by reacting a polyhydric alcohol with a measured amount of one or more polycarboxylic acids such as fumaric, succinic and maleic acids; then the resultant linear-polymeric material is reacted with styrene or another monomer adapted to undergo vinyl polymerization to provide a styrenated polyester which has been found suitable for making various articles and sheet material. Such articles and sheet materials may consist purely of the polyester, but usually they are reinforced with fibrous glass, fibrous cotton and the like. Usually such articles or sheet materials are cured in contact with mold surfaces or sheets of non-bibulous material in order to prevent contact with air which inhibits the polymerization of most polyesters. Heretofore it has been difficult to find a coating which adheres to polyester surfaces that are cured in the absence of air.

Therefore it is an object of this invention to provide a coating which adheres to polyester surfaces that are cured in the absence of air.

Another object is to provide such a coating to which conventional coating or lacquer formulations will adhere, or which may serve as a paint or lacquer vehicle.

Further objects will become apparent from the following detailed description in which it is my intention to set forth the applicability of the invention without thereby limiting its scope to less than that of all those equivalents which will be apparent to one skilled in the art.

In accordance with a preferred embodiment of the invention, I dissolve a polyelectrolyte resin in a suitable solvent, preferably a ketone, and then dissolve a plasticizing material in another portion of the same ketone or a compatible solvent. Then these two solutions are mixed together and sprayed on a polyester sheet which is allowed to dry in air. The coating is tough and adheres to the polyester surface. Curing or forced heat drying is not required: it has been found that curing or forced heat does not improve the properties of the coating; therefore, the elimination of baking and curing is a decided advantage in the application of the coating according to the invention.

Suitable polyelectrolytes which may be utilized in accordance with the invention include the following:

(1) Copolymer of methyl vinyl ether and maleic anhydride (sold as PVM/MA by General Aniline and Film Corporation).

(2) Carboxyl containing modified polystyrene (sold commercially as Lustrex 820 by Monsanto Chemical Company).

The following specific formulation is only an example and in no way limits the scope of the invention.

Example 1

| | Parts |
|---|---|
| Component A: | |
| Polyelectrolyte resin | 10 |
| Methyl ethyl ketone | 40 |
| Component B: | |
| Plasticizer (polyoxyethylene type) (sold commercially as Pluronic by Wyandotte Chemical Corp.) | 3 |
| Colloidal silica | 3 |
| Methyl isobutyl ketone | 50 |

After component A and component B are mixed together, the composition is sprayed onto a sheet of glass-fabric-reinforced polyester prepared by impregnating type 116 fabric which is woven from 450½ yarn that is impregnated with Selectron 5003-polyester synthetic resin. The sheet is cured at 225° F. for 40 minutes, curing being carried out with the impregnated sheet maintained between sheets of cellophane to prevent access of air to the surfaces during curing. The coating composition is dried in air and is found to be dry after approximately one hour at room temperature.

Thus, the invention is applicable for use in coating articles where drying is to be conducted at room temperatures which may be defined as no greater than 110° F.

The parts shown in Example 1 may be varied considerably within the scope of the invention. After the combining of components A and B, the proportion of solvent to solids included in the composition may be as much as five to six times as great as that shown or as little as one to two tenths of that shown. The proportion of polyelectrolyte resin to plasticizer may be varied in the following manner: as much as 5 parts of plasticizer may be used with 10 parts of polyelectrolyte resin or as little as ½ part plasticizer may be used with 10 parts of polyelectrolyte resin. Generally, polyoxyethylene condensate plasticizers have been found most suitable. These are more specifically reaction products of ethylene oxide and propylene oxide with organic compounds and are sold under the tradenames "Pluronic" and "Tetronic" by Wyandotte Chemical Corp. However other plasticizers such as polyethylene glycols, glyceryl monacetate, glycol sebacates, and phenyl glycidyl ether may suitably be used.

It is important that the polyelectrolyte resin, together with the plasticizer be deposited from non-aqueous or non-hydrous systems. A suitable solvent may be a ketone, an ester, an ether or a combination of these, but should contain not more than 1.0% water.

The resulting surface of the coating applied according to Example 1 is a roughened, matte surface which may be easily written upon with ordinary lead pencils. The colloidal silica is included in the composition in order to roughen the surface for pencil receptivity. In lieu of the colloidal silica, powdered flint or mica in the range of 600 to 1,000 mesh may be applicable. although the addition of these materials may be omitted, no appreciable reduction in transparency occurs in the sheet. When a colored finish is desired, a pigment may be included. The coating is sufficiently hydrophilic to be wetted by and retain India ink or other water-base inks.

A coating such as may be produced in accordance with Example 1 also provides a good subcoat for bonding gelatin, gum arabic and other colloidal-dispersing media used in the photo-reproduction art. This coating, pigmented or unpigmented, may be used as a finish for such articles as refrigerators, automobiles, luggage and similar articles or surfaces thereof which comprise a cross-linked polyester synthetic resin cured in the absence of air.

Thus it may be seen that my invention is broad in scope and is to be limited only by the claim. Having thus disclosed my invention, I claim:

The process of making a coated article comprising the steps of: curing in the absence of air a surface of an organic cross-linked polyester synthetic resin, applying to said surface a composition comprising 10 parts of a polyelectrolyte synthetic resin consisting of a carboxyl-containing modified polystyrene and ½ part to 5 parts of a polyoxyethylene plasticizer therefor, both being dissolved in a solvent comprising primarily an aliphatic ketone and comprising less than 1% water, and drying the coated article.

References Cited in the file of this patent

UNITED STATES PATENTS

| | | |
|---|---|---|
| 1,942,146 | Kollek et al. | Jan. 2, 1934 |
| 2,047,398 | Voss et al. | July 14, 1936 |
| 2,387,755 | Hanford | Oct. 30, 1945 |
| 2,453,052 | Van Etten | Nov. 2, 1948 |
| 2,668,801 | Schultz | Feb. 9, 1954 |
| 2,718,476 | Eichorn | Sept. 20, 1955 |
| 2,722,488 | Lawsberg | Nov. 1, 1955 |
| 2,726,233 | Warner et al. | Dec. 6, 1955 |

FOREIGN PATENTS

| | | |
|---|---|---|
| 647,273 | Great Britain | Oct. 30, 1945 |
| 707,549 | Great Britain | Apr. 21, 1954 |